United States Patent [19]

Yoshida

[11] Patent Number: 4,910,657
[45] Date of Patent: Mar. 20, 1990

[54] MICROPROCESSOR PROVIDING BUS ACCESS FOR UNCONDITIONAL INSTRUCTION EXECUTION

[75] Inventor: Toshiya Yoshida, Kawasaki, Japan
[73] Assignee: Kabushiki Kaisha Toshiba, Kawasaki, Japan
[21] Appl. No.: 154,017
[22] Filed: Feb. 9, 1988
[30] Foreign Application Priority Data Feb. 12, 1987 [JP] Japan .................................. 62-28358

[51] Int. Cl.⁴ .............................................. G06F 9/38
[52] U.S. Cl. .................................. 364/200; 364/232.8; 364/240; 364/240.5; 364/259; 364/259.9; 364/261.3; 364/261.4; 364/263.1
[58] Field of Search ........................ 364/200, 300, 900
[56] References Cited

U.S. PATENT DOCUMENTS 4,181,942 1/1980 Fourster et al. .................... 364/200
4,287,559 9/1981 Easley et al. ...................... 364/200

OTHER PUBLICATIONS

Lee, et al., "Branch Prediction Strategies and Branch Target Buffer Design," Computer, vol. 17, No. 1, Jan. 1984, pp. 6–22.

Primary Examiner—Raulfe B. Zache
Attorney, Agent, or Firm—Foley & Lardner, Schwartz, Jeffery, Schwaab, Mack, Blumenthal & Evans

[57] ABSTRACT

In a look-ahead control type of microprocessor, each area of a buffer memory temporarily stores a macroinstruction and a separate tag unit memory is provided for each such area, the tag being binary 1 when a macroinstruction is stored and binary 0 when an area becomes vacant. When one area becomes vacant because its macroinstruction is outputted to a decoder, the tag for that area provides a binary 0 to a NAND circuit which then outputs a binary 1 to one input of an AND gate. If the decoded macroinstruction is not an unconditional branch instruction, the decoder sets a flip-flop to provide a binary 1 to the other input of the AND gate so the AND gate will output a binary 1 to a bus access control logic circuit as a fetch demand signal so an external memory will provide a macroinstruction over an external data bus to the vacant buffer memory area. If the decoded macroinstruction is a unconditional branch instruction the decoder resets the flip-flop to provide a binary 0 to the AND gate which outputs a binary 0 so no fetch demand signal is provided. Thus, the external bus is not used to fetch a subsequent macroinstruction reducing the waiting time for the use of the bus for execution of unconditional branch instructions.

7 Claims, 2 Drawing Sheets

MICROPROCESSOR PROVIDING BUS ACCESS FOR UNCONDITIONAL INSTRUCTION EXECUTION

BACKGROUND OF THE INVENTION

1. Field of the Invention

The present invention relates to microprocessor of the look-ahead control type, which is capable of performing a high speed instruction excution.

2. Description of the Prior Art

In a microprocessor of the present look-ahead control type, pipeline processing is performed in order to realize high speed instruction execution as well as realizing multifunction and high speed performance of the system, by employing a microprogram control system.

For the purpose of increasing the decoding efficiency of macroinstructions in these microprocessors described above, it is a general later from macroinstructions which are currently being executed. In this case, the macroinstructions read out of an external memory are temporarily stored in a buffer memory within an instruction decoder of the microprocessor and the macroinstructions thus stored are read out of the buffer memory and are then decoded.

FIG. 1 shows a block diagram of the conventional microprocessor for performing the decoding operation described above. Namely, in FIG. 1, the microprocessor 1 comprises a decoder 3 for decording the macroinstructions, an instruction execution unit 5 for executing the decoded instructions and a bus controller 7 for controlling an external data bus 100 in accordance with a demand for using the bus by both the decoder 3 and the instruction execution unit 5.

The decoder 3 includes therein a buffer 9 for temporarily storing a plurality of macroinstructions. The buffer 9 has a memory capacity N times larger than the amount of data which can be transferred by the external data bus 100 at a time macroinstructions which are to be executed after the instructions currently being executed have been completed are transferred at a time and are stored therin in accordance with the transfer capability of the external data bus 100. The macroinstructions thus stored in the buffer 9 are decoded by the decoder 3 after they are successively read out, and the macroinstructions thus decoded are applied to the instruction execution unit 5 through an internal bus 200.

Furthermore, when the macroinstructions are read out of the buffer 9 and any vacancy occurs in the buffer 9 for storing the amount of data amount which can be transferred at a time by the external data bus 100, the decoder 3 demands to of the bus controller 7 a fetch of the macroinstructions via a signal line 300, the fetch being a read-out of the macroinstructions from an external memory (not shown) which is connected to the external data bus 100.

The instruction excution unit 5 is for executing the macroinstructions which are decoded by the decoder 3 and applied thereto via the internal bus 200. The instruction execution unit 5, when using the external data bus 100 in association with the instruction executions, suplies the bus-controller 7 with a demand for using the external data bus 100 via the signal line 400.

The bus controller 7 fetches the macroinstructions from the external memory (not shown), responsive to a fetch demand for the macroinstructions from the decoder 3 and it also transfers the macroinstructions thus feched to the buffer 9 in the decoder 3 via the internal bus 500. Moreover, the bus controller 7, when the use of the external data bus 100 is demanded at the same time by the decoder 3 and the instruction execution unit 5, adjusts or coordinates these demands in accordance with the priority orders preliminarily established. In order to realize high speed instruction execution, the priority of the use of the external data bus relating to the normal instruction execution is normally higher than that of the macroinstruction fetch. However, this is only the case when simultaneous demands for the use of the bus occur. Accordingly, even when any demand for the use of the external data bus 100 involving the instruction execution having a higher priority occurs, the use of the external data bus 100 involving the instruction execution has to be delayed until the use of the bus 100 by the macroinstruction fetch having a lower priority order terminates when the external data bus 100 is being used for the macroinstruction fetch.

In the microprocessor in the prior art thus constructed, when the instruction which has been read out of the buffer 9 provided within the decoder 3 and decoded by the decoder, belongs to an unconditional branch instruction, it is normal that a plurality of macroinstructions which have already been stored in the buffer 9 are all processed as being invalid in order to execute instructions at the branch destination and the latter is then fetched and is newly stored in the buffer 9.

As described in the foregoing prior art, in the microprocessor for carrying out the instruction execution in such a manner that the macroinstructions are preliminarily locked-ahead and are temporarily stored in the buffer 9 within the decoder 3, the subsequent macroinstructions which have been stored are all made invalid when the instructions to be decoded and executed belong to unconditional branch instructions and the instructions at the branch destination are to be executed. Accordingly, in the case described above, although all of the macroinstructions stored in the buffer 9 are made invalid, an unnecessary operation that they are to be decoded by the decoder was performed. As a result, an combined circuit such as PLA (Programmable Logic Array) which performs the decoding operation is operated uselessly, thus increasing power dissipation and calorific value.

In addition, due to the non-effective macroinstruction fetch through the external data bus which results in the useless instruction storing in the buffer 9 and the useless instruction decoding in the decoder, other operations for the instruction execution via the data bus are hindered and the use of the bus 100 has to be delayed until the useless fetch operation terminates, thus delaying the execution of the other useful instructions.

SUMMARY OF THE INVENTION

It is therefore an object of the present invention to provide a microprocessor capable of executing instructions at high speed as well as increasing the efficiencies of both the fetch and decoding operations.

It is another object of the present invention to provide a microprocessor comprising an instruction decoder having a plurality of tag bit memories corresponding to each of memory areas of a buffer memory within the decoder and logical circuit means in which, when the macroinstructions decoded by the decoder are those which belong to unconditional branch instructions, a fetch demand is suppressed by a combined gate circuit consisting of a flip-flop and an AND gate while making all of the instructions already fetched and stored in the buffer memory invalided by the output signal from the flip-flop and the tag bit memories.

In order to achieve the above objects, the microprocessor having instruction execution means for executing macroinstructions by look-ahead control, according to the present invention is characterized in that it comprises: instruction decoding means including buffer memory means for temporarily storing a plurality of macroinstructions therein and for decoding the macroinstructions stored in the buffer memory means by successively reading them therefrom; bus controlling means having bus access control logic means for fetching the macroinstructions from an external data bus and for storing them in the buffer memory means through an internal bus, in accordance with a fetch demand from the instruction decoding means; and gate circuit means for inhibiting the decoding operation of all of the macroinstructions which have already been stored in the buffer memory means as well as preventing the fetch demand from the decoding means from being applied to the bus access control logic means when the macroinstructions decoded by the decoding means belong to unconditional branch instructions.

These and other objects, features and advantages will become apparent from the following detailed description of the invention with reference to the accompanying drawings.

DETAILED DESCRIPTION OF THE PREFERRED EMBODIMENT

Figure 2:
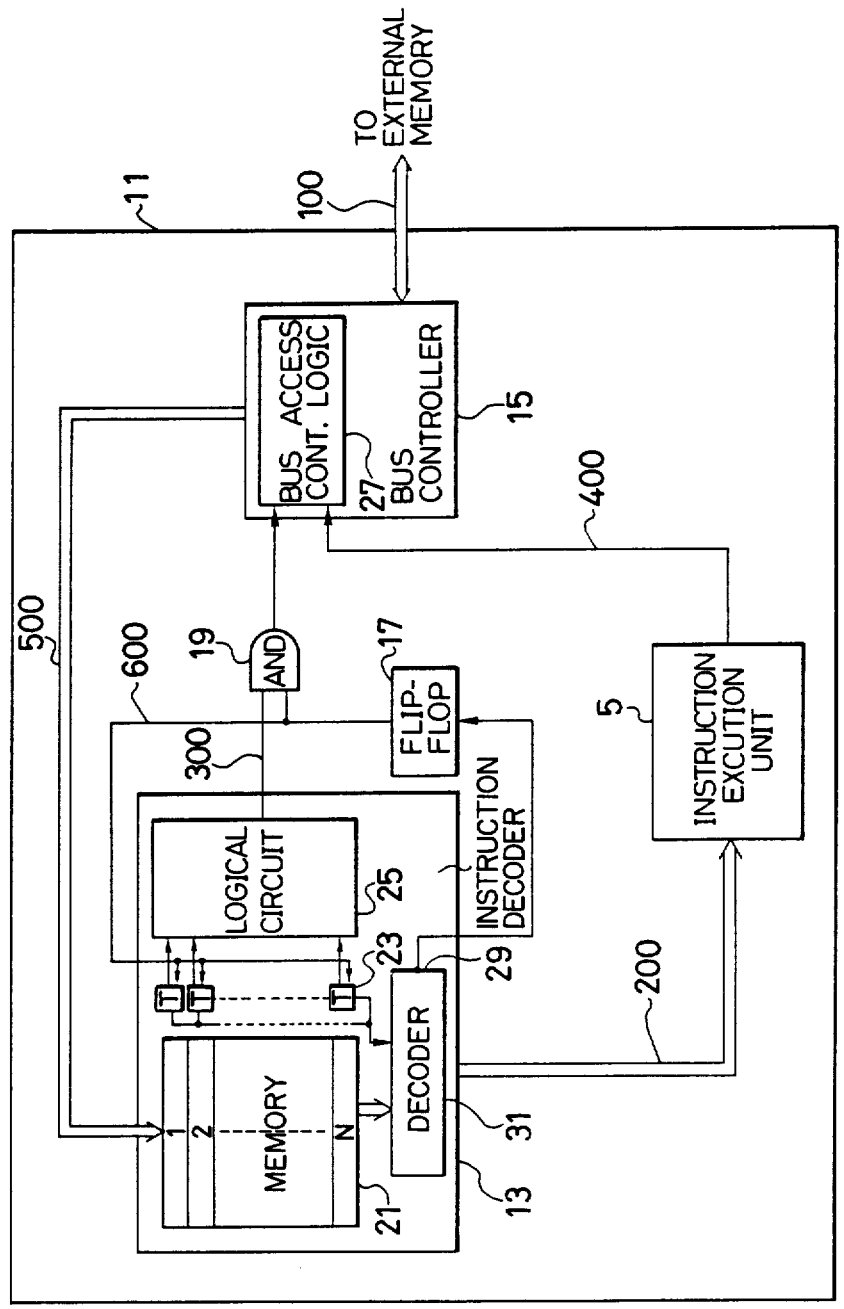
FIG. 2 is a block diagram of the microprocessor of the look-ahead control type according to the present invention.

In FIG. 2, the microprocessor 11 according to the present invention comprises an instruction decoder 13 having a buffer memory 21 which has N memory areas for temporarily storing macroinstructions, for decoding the macroinstruction stored in the buffer memory, an instruction execution unit 5, a bus controller 15 for controlling an external data bus 100, a flip-flop circuit 17 and an AND gate 19.

Figure 1:
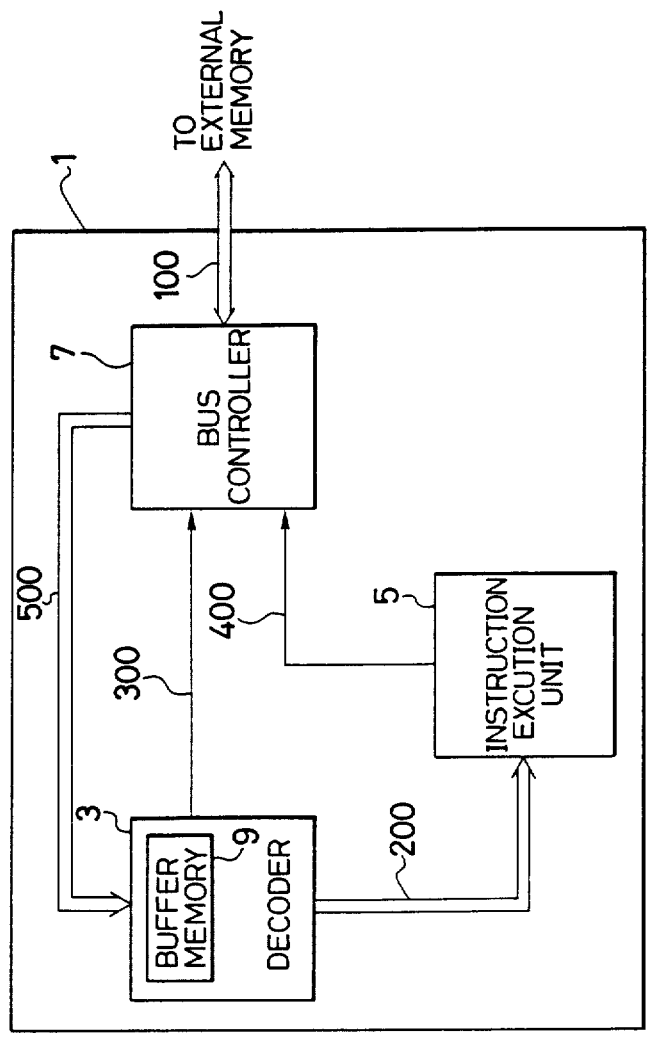
FIG. 1 is a brief block diagram of a microprocessor of the look-ahead control type according to the prior art.

Among reference numerals used in FIG. 2, the same reference numerals as those used in FIG. 1 indicate elements of the same construction and having the same function, respectively.

The buffer memory 21 in the decoder 13 has a suffecient memory capacity for the bit numbers constituting one macroinstruction which the internal bus 500 can transfer at a time. The macroinstructions to be executed are stored into the buffer memory 21 after the instructions being currently executed has been terminated.

The decoder 13 also comprises a decode portion 31, and a plurality of tag bit memories 23 corresponding to the memory areas of the buffer memory 21, which indicate whether or not the macroinstructions stored in each memory areas in the buffer memory 21 are valid. Namely, when a certain tag bit memory 23 contains therein the binary digit "1", it indicates that a macroinstruction stored in the buffer memory 21, which memory area corresponding to the specific tag bit memory in question is valid. On the other hand, when it contains the binary digit "0", it indicates that the macroinstruction stored in the specific memory area in the buffer memory 21 corresponding to the tag bit memory is invalid. The content of each tag bit memory 23 is made "1" when the macroinstructions are stored in each of the memory areas of the buffer memory 21 and it is made "0" when each of the corresponding memory areas of the buffer memory 21 becomes vacant.

The instruction decoder 13 also comprises a logical circuit 25 with its inputs connected to each of the tag bit memories 23 and with its output connected to one input of the AND gate 19. The logical circuit 25 produces at its output line 300, the binary bit signal "1" when at least one of the tag bit memories 23 contains the binary digit "0". The logical circuit 25 for performing the logical operation as described above relative to the input signals from the tag bit memories 23 can be realized by a NAND gate circuit.

The bus controller 15 is connected to an external memory (not shown) through the external data bus 100 and also performs an input/output control of the external data bus 100 which is a data transfer path when executing the macroinstructions in the instruction execution unit 5 or macroinstruction fetch. The input/output control is carried out in accordance with either a macroinstruction fetch demand from the decoder 13 or a bus use demand from the instruction execution unit 5. The bus controller 15 also comprises a bus access control logic 27 receptive of the macroinstruction fetch demand from the decoder 13 or the bus use demand from the instruction execution unit 5.

The bus access control logic 27 firstly accepts the bus use demand relating to the instruction execution having a higher priority order for use of the external data bus 100 than that of the macroinstruction fetch demand, when each of the two demands are applied thereto at the same time. Moreover, when the bus access control logic 27 receives the bus use demand from the instruction execution unit 5, the bus controller 15 uses the external data bus 100 so as to execute the instructions. On the other hand, when the macroinstruction fetch demand is accepted by the bus access control logic 27 of the bus controller unit 15, i.e., the output of the AND gate 19 produces the binary "1", the macroinstructions are fetched from the external memory (not shown) and the macroinstructions are fetched from the external memory (not shown) and the macroinstructions thus fetched are transferred to the buffer memories 21 through the internal bus 500.

The flip-flop circuit 17 has its input connected to the output terminal 29 of the decode portion 31 and its output connected to the other input of the AND gate 19 and to each of the tag memories 23. The flip-flop circuit 17 is set at the binary "1" when the macroinstructions decoded by the decoder 13 are not branch instructions, while it is reset at "0" when the macroinstructions belong to unconditional branch instructions.

The output terminal 29 of the decode portion 31 is constructed to supply signals to the flip-flop circuit 17 such that the flip-flop circuit 17 is reset when the macroinstructions decoded by the decode portion 31 belong to unconditional branch instructions and the flip-flop circuit 17 is set when the macroinstructions do not belong to the unconditional branch instructions.

When the flip-flop circuit 17 is reset to be "0", all of the tag bit memories 23 are set at "0", i.e., the binary 37 0" is stored in each of the tag bit memories 23, all of the macroinstructions which have been stored in the buffer memory 21 are made invalid, and the decoding operation by the decode portion 31 is inhibited.

The logical products are taken in the AND gate 19 between the output from the logical circuit 25 and the output signal from the flip-flop ciecuit 17 and the resulting signal from the AND gate 19 is applied to the bus access control logic 27. In addition, the AND gate 19 produces the binary bit "1" when the macroinstructions stored in the buffer memory 21 and decoded by the decoder 13 do not belong to the unconditional branch instructions as at least one of the tag bit memories 23 contains the binary "0", and it demands macroinstruction fetch of the bus access control logic 27.

The operation of the macroprocessor according to the present invention thus constructed will now be described with reference to FIG. 2.

When a macroinstruction stored in the buffer memory 21 is decoded by the decoder 13 and the microinstruction thus decoded is found to be the one which does not belong to the unconditional branch instructions, the flip-flop circuit 17 is set at "1". Under this condition, when any bit vacancy occurs at least in any one of the memory areas of the buffer memory 21, the tag bit memory corresponding to the particular memory area of the buffer memory 21 becomes "0" bit condition. As a result, the output from the logical circuit 25 becomes "1" and this output signal is applied to one input of the AND gate 19 via signal line 300. In this case, the binary bit "1" is applied to the other input of the AND gate 19 from the flip-flop 17 so that the output of the AND gate 19 comes "1" and the macroinstruction fetch demand is applied to the bus access control logic 27. This demand will be accepted after the use of the external data bus 100 by the instruction execution unit 5 is terminated, when it is being used by it. After the macroinstruction fetch demand has been accepted, macroinstructions are fetched by the bus controller 15 from the external memory (not shown) via the external data bus 100 and they are stored in the memory areas of the buffer memory 21 which is now vacant, through the internal bus 500.

On the other hand, when the macroinstruction decoded by the decoder 13 is an unconditional branch instruction, the flip-flop circuit 17 is now reset to be "0". On the other hand, when the macroinstructions are read out of the memory areas of the buffer memory 21, and at least one vacant memory area occurs in the buffer memory 21, the corresponding tag bit memory 23 becomes "0", thus the output of the logical circuit 25 becomes 1" and the macroinstruction fetch demand is applied to one input of the AND gate 19 through the signal line 300.

However, since the flip-flop circuit 17 has been reset to be "0", when the other input of the AND gate 19 is supplied with "0" from the logical circuit 25, the output from the AND gate 19 becomes "0". Namely, the macroinstruction fetch demand is not applied to the bus access control logic 27. Moreover, when the flip-flop circuit 17 is reset at "0", the contents of all of the tag bit memories 23 are made "0" and this will in turn make all of the macroinstructions stored in the buffer memories 21 invalid. In other words, when the macroinstructions decoded by the decoder 13 belong to unconditional branch instructions, the buffer memory becomes vacant in some memory area or areas. As a result, even when the macroinstruction fetch demand is produced from the decoder 13, the fetch demand is not applied to the bus access control logic 27 so that the fetch operation of the macroinstructions is not performed. In this case, all of the macroinstructions which have been stored in the buffer memories 21 are made invalid and the decoding operation is inhibited.

As described in the foregoing, when the macroinstructions thus decoded belong to unconditional branch instructions, the fetch demand after the decode of the branch instruction is not accepted. As a result, the unnecessary operation that subsequent macroinstructions for executing non-effective instructions at the branch destination are fetched, can be eliminated, which has been otherwise performed in the prior art. Consequently, the use of the external data bus 100 for the unnecessary operation can be eliminated, and an efficient use of the external data bus 100 can be realized. According to the present invention, the waiting time for using the external data bus 100 for instructions which really necessitate the use of the bus for their executions can be reduced and high speed execution of the instructions can be realized.

Moreover, when the macroinstructions decoded by the decoder belong to the unconditional branch instructions, all of the macroinstructions which have been stored in the buffer memory 21 are no longer decoded and an unnecessary operation for decoding the resulting invalid macroinstructions can be omitted.

As described in the foregoing embodiment, in the microprocessor according to the present invention, when the macroinstructions decoded by the instruction decoder belong to unconditional branch instructions, the subsequent macroinstruction fetch demand is suppressed and the decoding operation of the macroinstructions which have already been fetched and stored in the buffer memory is inhibited, thereby increasing the efficiencies of the fetch operation and the decoding operation without the conventional unnecessary operation and realizing high speed execution of instructions.

While the invention has been described in its preferred embodiment, it is to be understood that the words which have been used are words of description rather than limitation and that various changes and modifications may be made within the purview of the appended claims without departing from the true scope and spirit of the invention in its broader aspects.

What is claimed is:

1. A microprocessor having instruction execution means for executing macroinstructions by look-ahead control, which comprises:
   instruction decoding means, including buffer memory means for temporarily storing a plurality of macroinstructions therein, for decoding the macroinstructions stored in said buffer memory means by successively reading said instructions therefrom;
   bus controlling means coupled with an external memory for fetching macroinstructions from said external memory via an external data bus coupled to said buffer memory means and for supplying said macroinstructions to said buffer memory means through an internal bus in accordance with a fetch demand from said instruction decoding means coupled to said controlling means; and
   gate circuit means coupled to said decoding means and said bus controlling means for inhibiting said decoding means from decoding all of the macroinstructions which have already been stored in said buffer memory means as well as preventing said fetch demand from said decoding means from being applied to said bus controlling means when macroinstructions decoded by said instruction decoding means belong to unconditional branch instructions.

2. The microprocessor as claimed in claim 1 wherein said instruction decoding means further comprises second memory means corresponding to each of the memory areas of said buffer memory means for indicating whether or not macroinstructions stored in said buffer memory means are valid and a logical circuit having a plurality of inputs coupled to each of said second memory means for producing a signal which indicates said fetch demand when the content of at least one of said second memory means indicates that one of the macroinstructions in said buffer memory means is valid.

3. The microprocessor as claimed in claim 2 wherein said second memory means comprises a plurality of tag bit memories.

4. The microprocessor as claimed in claim 2 wherein said gate circuit means comprises a third memory means and a logic gate, said third memory means being coupled to said decoding means and being coupled to one input of said logic gate and to each of said second memory means, another input of said logic gate being coupled to the output of said logical circuit and an output of said logic gate being coupled to one input of a bus access control logic means in said bus controlling means.

5. The microprocessor as claimed in claim 4 wherein said third memory means comprises a flip-flop circuit and said logic gate comprises an AND gate.

6. The microprocessor as claimed in claim 5 wherein said flip-flop circuit is set at "1" when macroinstructions decoded by said decoding means do not belong to unconditional branch instructions and said flip-flop is reset when macroinstructions decoded by said decoding means belong to unconditional branch instructions, thereby inhibiting said fetch demand from being output from said AND gate and making all macroinstructions already stored in said buffer memory invalid by a reset output of logical "0" from said flip-flop.

7. The microprocessor as claimed in claim 1 wherein said instruction excution means is coupled to said bus controlling means.

* * * * *